No. 692,395.  
M. F. WHITON.  
RAIL BOND.  
(Application filed June 25, 1901.)

Patented Feb. 4, 1902.

(No Model.)

Witnesses:  
H. B. Davis.  
John W. Decrow.

Inventor:  
Morris F. Whiton.  
by B. J. Noyes  
Atty.

THE NORRIS PETERS CO., PHOTO-LITHO., WASHINGTON, D. C.

United States Patent Office.

MORRIS F. WHITON, OF HINGHAM, MASSACHUSETTS.

RAIL-BOND.

SPECIFICATION forming part of Letters Patent No. 692,395, dated February 4, 1902.

Application filed June 25, 1901. Serial No. 65,950. (No model.)

*To all whom it may concern:*

Be it known that I, MORRIS F. WHITON, of Hingham, in the county of Plymouth and State of Massachusetts, have invented an Improvement in Rail-Bonds, of which the following description, in connection with the accompanying drawings, is a specification, like letters on the drawings representing like parts.

This invention has for its object to improve and simplify the construction of rail-bonds, comprising, essentially, a laminated strip, to the end that the extremities of the strip may be very securely held together to insure perfect electrical connection of the several parts composing the bond. In accordance with this invention the laminated strip is composed of a number of like superimposed plates or strips of copper or other material, formed to present a pair of flat feet and an intermediate extensible portion, said plates or strips being made separate or independent of each other, and when placed one upon another the flat feet will comprehend the free ends of all the plates or strips. The free ends of the plates or strips will be dipped in melted solder, which is allowed to enter between them, and they are then pressed together by a suitable clamp and secured by the solder when it hardens. When dipping the free ends of the plates or strips in the melted solder, they will spring apart more or less, which allows the solder to enter freely between, which is important, for the reason that said ends thereby become fully coated with the solder, and consequently will be very firmly secured together and a perfect electrical connection insured. The ends of the laminated strip having been thus secured together by the solder are then inclosed in a ferrule, band, or clip, which passes around them and which is also secured to them by solder, each ferrule, band, or clip having disposed upon one side a flat plate of solder for securing the bond to the rails. This ferrule, band, or clip incloses the extremity of the bond and protects the sides thereof in such manner as to prevent exudation of the solder therefrom when the bond is being attached to the rails by the application of heat.

Figure 1:
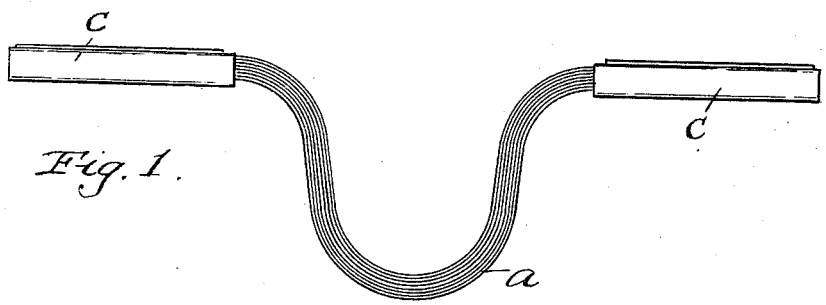
Figure 2:
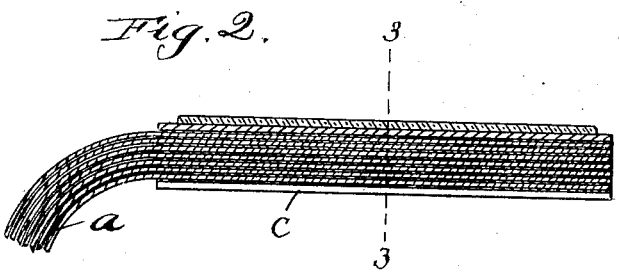
Figure 3:
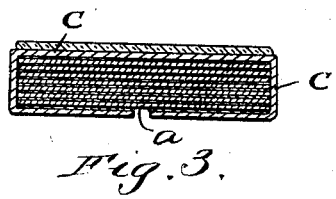

Figure 1 shows in side elevation a rail-bond embodying this invention. Fig. 2 is a longitudinal section of one of the extremities of the bond on an enlarged scale. Fig. 3 is a cross-section of one of the extremities of the bond, taken on the dotted line 3 3, Fig. 2.

The laminated strip comprises a number of plates or strips $a$, of copper or other suitable material, made of substantially the same length and placed one upon another. These several plates or strips are bent or formed to present a pair of flat feet and an intermediate extensible portion, herein shown as arched. The free ends or extremities of the laminated strip are dipped in melted solder for the purpose of securing them together, and while held in the melted solder for this purpose they will spring apart more or less, so that the solder freely enters between them and thoroughly coats them, and when withdrawn from the melted solder said free ends or extremities are pressed together by a suitable clamp or clamps, so that when the solder hardens they will be firmly secured together and a perfect electrical connection insured. The intermediate portions of the laminated strip will not be connected together. If the bond thus constructed should be applied to the rails, it will be found that the solder interposed between the several layers at the extremities thereof would exude more or less and would result in an imperfect electrical connection between the several members or parts composing the bond, and to provide against this tendency said extremities or flat feet are inclosed by or wrapped with a ferrule, clip, or band $c$, which may be simply a plate of sheet-copper wrapped around said extremities and soldered thereto. The ferrule, clip, or band which is thus wrapped around said flat feet practically closes the side openings between the several layers of the laminated strip and effectively prevents exudation of the solder therefrom when the bond is applied to the rails.

Each ferrule, clip, or band has upon one side a plate or thick layer $d$, of solder, which is used for connecting the bond to the rails. When applying the bond to the rails, the rails will be operated upon in any suitable manner to provide a bright surface, and they will then be heated, and when hot enough to melt the solder the bond having the layers of solder upon its flat feet will be pressed hard against said rails and held in position by suitable clamps or otherwise until the solder hardens. It is the heat thus utilized in attaching the bonds of the rails which causes the solder to exude between the several layers of the laminated strip unless the side openings thereat are closed by the ferrule, clip, or band. Said ferrule, band, or clip also serves to hold the several layers composing the flat feet in correct relative position at all times, and particularly when applying the bond to the rails, for it will be seen that when applying the bond to the rails the solder which secures together the several plates or strips $a$ will soften and would tend to separate if not thus held.

I claim—

A rail-bond composed of a laminated strip having flat feet and an intermediate extensible portion, solder interposed between the several layers composing said flat feet and a ferrule, band or clip inclosing said flat feet and secured thereto by solder or otherwise, thereby closing the side openings between the several layers composing the flat feet, substantially as described.

In testimony whereof I have signed my name to this specification in the presence of two subscribing witnesses.

MORRIS F. WHITON.

Witnesses:
B. J. NOYES,
JOHN W. DECROW.